United States Patent [19]
Bradley

[11] 3,854,168
[45] Dec. 17, 1974

[54] SKINNING TREE

[76] Inventor: Orval C. Bradley, 19 Sunset, Willows, Calif. 95988

[22] Filed: June 26, 1972

[21] Appl. No.: 266,463

[52] U.S. Cl. ............... 17/44.2, 248/42, 294/79
[51] Int. Cl. ........................................ A22b 5/06
[58] Field of Search ............ 17/21, 45, 50, 1 R, 14, 17/17, 24, 44, 44.2; 294/79; 214/95 A, 141; 269/65, 74, 81, 102, 309; 43/21.2; 248/38, 42, 44, 45

[56] References Cited
UNITED STATES PATENTS

| | | | |
|---|---|---|---|
| 568,028 | 9/1896 | Inman | 17/24 |
| 2,548,038 | 4/1951 | Moliskey | 43/21.2 X |
| 2,808,676 | 10/1957 | Major | 43/23 |
| 2,941,767 | 6/1960 | Mogey | 248/42 |
| 3,354,573 | 11/1967 | Johansson | 43/21.2 |
| 3,553,767 | 1/1971 | Herzog | 17/21 |
| 3,599,277 | 8/1971 | Brown | 17/21 |
| 3,623,187 | 11/1971 | Grubbs | 17/21 |
| 3,628,759 | 12/1971 | Knedlik | 248/42 |

FOREIGN PATENTS OR APPLICATIONS

| | | | |
|---|---|---|---|
| 35,930 | 3/1906 | Switzerland | 17/44 |

Primary Examiner—Anton O. Oechsle
Assistant Examiner—Harry G. Strappello
Attorney, Agent, or Firm—Naylor, Neal & Vilkema

[57] ABSTRACT

A portable animal skinning tree for holding large game animals for skinning has a base which includes a spike and a base plate for engagement of the base with various environmental supports, a telescoping boom extending upwardly from the base and an arch member attached to the upper end of the boom and terminating in an eye for attachment of a conventional spreader bar assembly thereto. The base includes means for limiting the pivoting of the boom with respect thereto. A chain is attached to the arch member and is adapted for connection to any available environmental support to support the upper end of the skinning tree.

6 Claims, 11 Drawing Figures

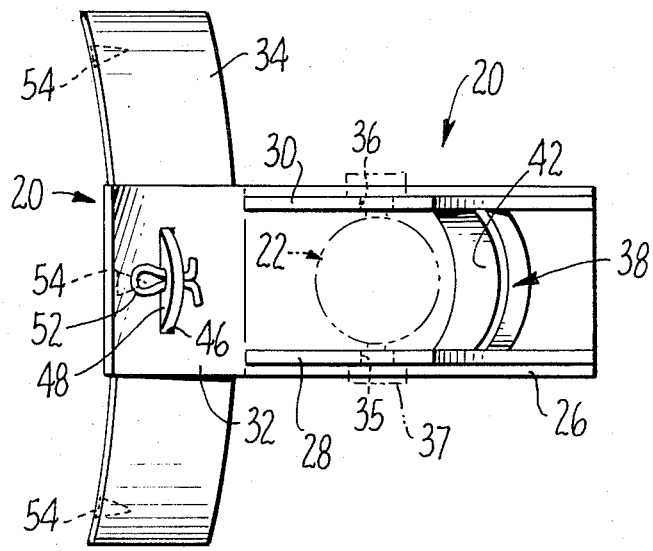
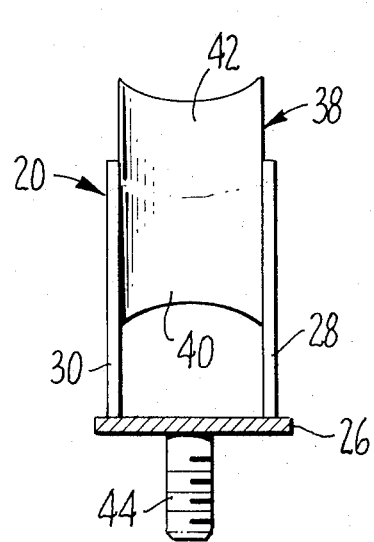
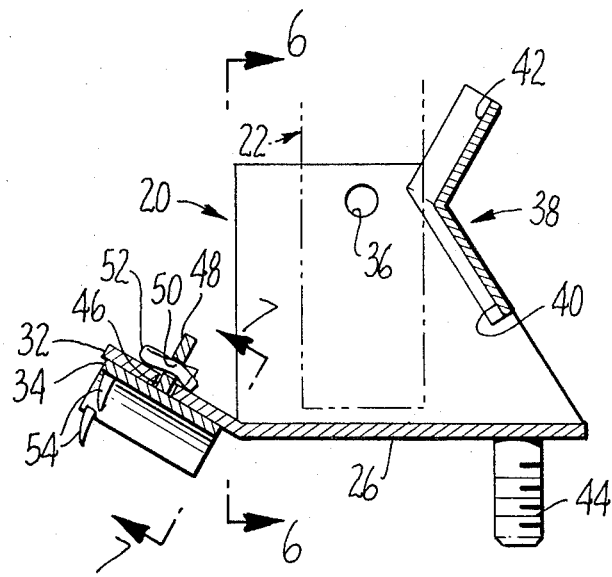
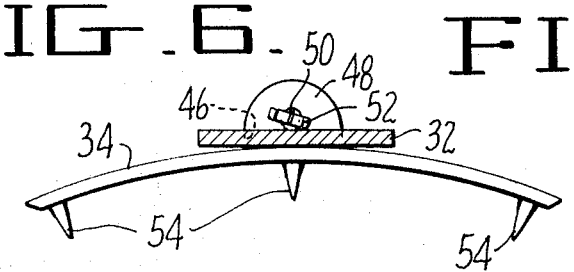

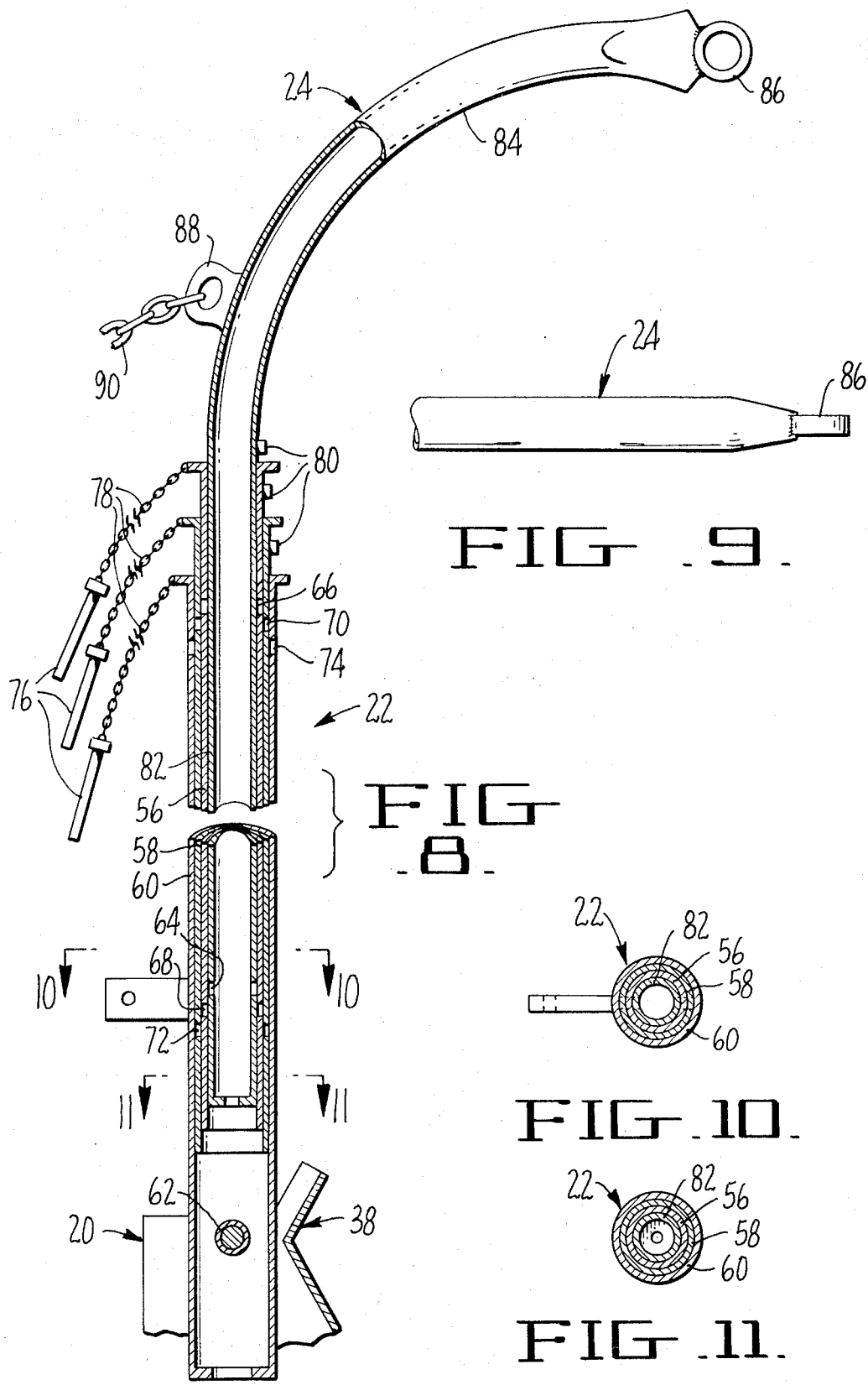

SKINNING TREE

BACKGROUND OF THE INVENTION

This invention relates to the field of supporting devices for suspending a large game animal such as a deer at a desired height and orientation for skinning and butchering while in a wilderness environment. In such cases, it is convenient to suspend the animal, which may weigh over 100 pounds, off the ground for greater accessibility. However, any device for suspending an animal in such a manner may have to be manually carried into and out of remote areas by a hunter. Therefore it is desirable that such a device be both light weight, and simple and compact in construction. It is also desirable that such a device be readily adaptable to any type of support means available such as a tree, or an off the road vehicle frame member.

BRIEF DESCRIPTION OF THE INVENTION

Accordingly, it is an object of the present invention to provide a device for suspending a large game animal, which is both simple and compact in construction.

Another object of the present invention is to provide such a device which may be readily adapted for use with several different types of environmental support means likely to be encountered by a hunter Still another object of the present invention is to provide such a device which is inexpensive to construct and easy to erect and manipulate.

These and other objects are achieved by the present invention which includes a telescoping boom member having a base, pivotally attached thereto, which base is adapted for engagement with several different supporting objects that may present themselves to a hunter, such as a tree or an off the road vehicle frame member. The telescoping boom is arranged to extend upwardly from the base and has an arched member attached to the distal end thereof which is provided with an eye for attachment of a conventional spreader bar assembly. Auxillary support means is provided by a chain attached to the arched member and adapted for connection to any available support to limit rotation of the boom with respect to the base and to minimize bending moments in the boom.

BRIEF DESCRIPTION OF THE DRAWINGS

In the drawings:

FIG. 4 is a side elevational view in section of the base of the skinning tree, FIG. 5 is a top plan view of the base shown in FIG. 4, FIG. 6 is an end view of the base shown in FIG. 7, taken along a plane indicated by the arrows 6—6, FIG. 7 is an elevational view of the tree-engaging plate of the base shown in FIG. 4 taken along a plane indicated by the arrows 7—7, FIG. 8 is a sectional view of the telescoping boom of the skinning tree, FIG. 9 is a top plan view of the end of the telescoping boom shown in FIG. 8, FIG. 10 is a sectional view of the boom shown in FIG. 8 taken along the plane indicated by the arrows 10—10, FIG. 11 is a sectional view of the boom shown in FIG. 8 taken along a plane indicated by the arrows 11—11.

DESCRIPTION OF THE PREFERRED EMBODIMENT

Figure 1:
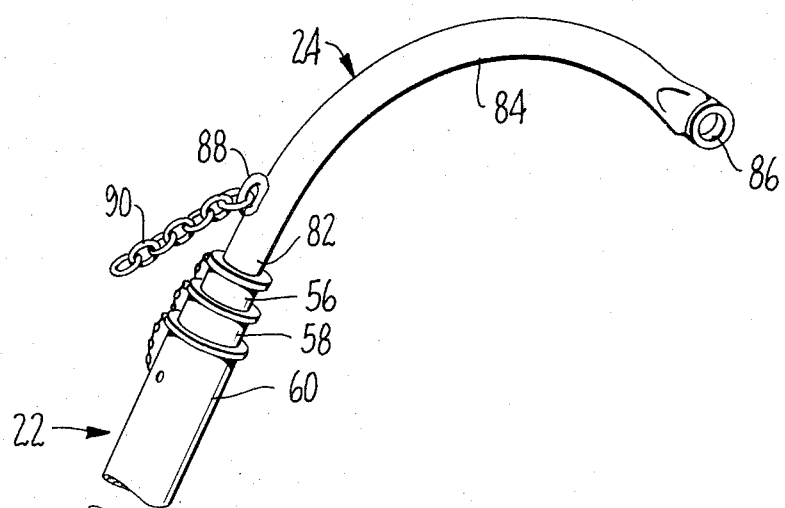
FIG. 1 is a perspective view of the skinning tree of the present invention.

Referring to FIG. 1, the skinning tree of the present invention includes a base, shown generally at 20, a telescoping boom, shown generally at 22 pivotally mounted on the base, and an extension in the form of an arch member shown generally at 24, extending from the distal end of the telescoping boom.

The base 20 provides a primary anchoring means for securing the lower end of the boom against lateral displacement with the body of the boom inclined from vertical and comprises a base plate 26, spaced, parallel, upstanding bracket plates 28 and 30 attached to plate 26, a mounting plate 32 attached to the base plate, and a tree-engaging plate 34 removably attached to the mounting plate.

Figure 2:
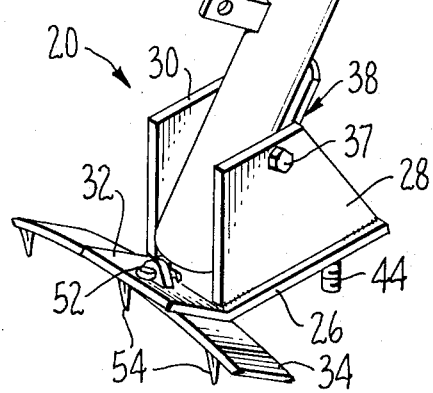
FIG. 2 shows a skinning tree embodying the present invention mounted on an off the road vehicle.
Figure 2:
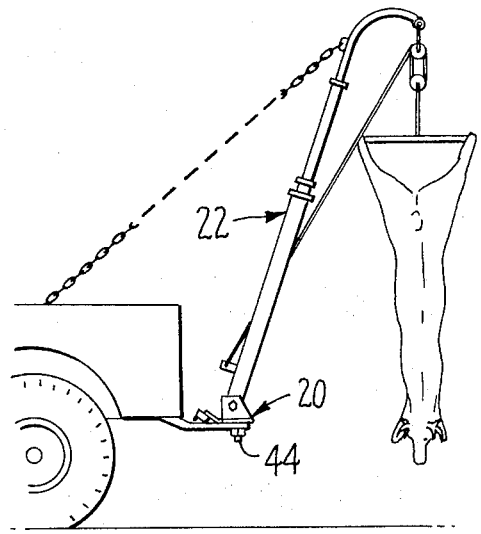

Referring to FIGS. 4 and 5, upstanding bracket plates 28 and 30 have holes 35 and 36, respectively, formed therein for pivotally mounting the telescoping boom on the bracket plates by means of a pivot bolt 37. An angled stop member 38 includes a first portion 40 disposed between upstanding bracket plates 28 and 30 and secured thereto, and a second portion 42 adapted to engage telescoping boom 22 to limit pivoting of the boom with respect to base 20. Base plate 26 has a threaded stud bolt 44 extending therefrom for securing the base plate to a flat, apertured plate member such as a bumper hitch plate, as shown in FIG. 2.

Figure 3:
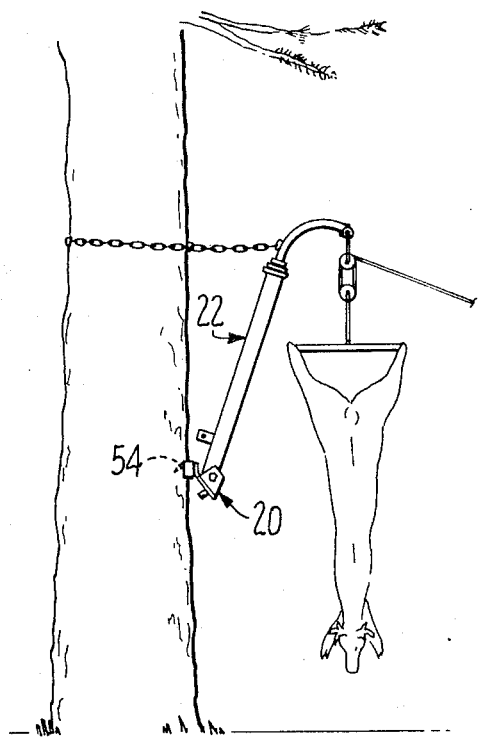
FIG. 3 shows the skinning tree of the present invention mounted on a tree trunk.

Referring to FIGS. 4 and 7, the tree-engaging plate 34 is provided with a plurality of spikes 54 for piercing a tree trunk, and is attached to mounting plate 32 by an upstanding tab 48 having a hole 50 formed therein. Tab 48 projects through a slot 46 in mounting plate 32 and is retained therein by a cotter pin 52 disposed in hole 50. The mounting of the skinning tree on a tree trunk is illustrated in FIG. 3.

As shown in FIG. 8, telescoping boom 22 comprises a series of tubular members 56, 58 and 60, respectively, disposed telescopically within one another. A diametrical hole 62 is provided adjacent one end of outer tubular member 60 for mounting the boom member on upstanding bracket plates 28 and 30 by means of the pivot bolt 37.

The arch member 24 and the telescoping members 56, 58 and 60 may be selectively and individually extended and retracted to vary the composite length of the boom. Diametrically extending apertures 64, 66, 68, 70, 72 and 74 and cooperating pins 76 are provided to lock the members in extended condition. To lock a particular pair of members in extended condition, it is simply necessary to align the apertures therein and extend the cooperating pins through the aligned apertures. The pins 76 are restrained against loss by chains 78 secured between the respective members and the pins. Stops 80 limit the degree to which the members may telescope together.

Arch member 24 includes a straight portion 82 disposed telescopically within the distal end of boom 22, and a curved portion 84 which extends from the distal end of boom 22 and terminates in an eye 86 providing means from which an animal may be suspended. A second eye 88 is mounted on the arch member 24 where it emerges from the boom and provides a secondary anchoring means spaced from the base member whereby the upper end of the telescoping boom may be anchored by means of a line in the form of a chain or the like attached in tension sustaining relationship to a tree trunk, frame, or other susporting member in conjunction with which the skinning tree is being used to further limit pivoting of the telescoping boom with respect to the foot and to relieve bending movements in the boom. Such a line formed by a chain is designated in the drawings by the numeral 90.

While a preferred embodiment of the invention has been illustrated and described it should be understood that the invention is not intended to be limited to this embodiment, but rather is defined by the accompanying claims.

I claim:

1. A portable skinning tree for suspending large game animals comprising:
   a. a base including a mounting plate having a slot therein and a tree-engaging plate detachably mounted on the mounting plate, said tree engaging plate including an upstanding tab insertable into the slot in the mounting plate, said tab having a hole therein through which a cotter pin may be inserted to retain the tab in the slot and wherein the tree engaging plate has at least one spike provided thereon for engaging a tree trunk,
   b. a telescoping boom pivotally connected to the base, and
   c. an arch member extending from the distal end of the telescoping boom.

2. The combination of claim 1 wherein the base further comprises parallel spaced bracket plates and wherein the telescoping boom is disposed between the bracket plates and is pivotally mounted on the bracket plates.

3. The combination of claim 1 further comprising stop means for limiting the pivoting of the telescoping boom with respect to the base.

4. The combination of claim 2 further comprising stop means attached to at least one of the bracket plates for limiting pivoting of the telescoping boom with respect to the base.

5. In combination:
   a. a base including intersecting plate members,
   b. spike means attached to one of the plate members for engagement of the base with a tree trunk,
   c. bolt means attached to the other of the plate members for mounting the plate on a flat appertured surface,
   d. bracket means attached to the base for mounting a boom thereon,
   e. a telescoping boom pivotally mounted on the bracket means,
   f. an arch member attached to the distal end of the telescoping boom and terminating in an eye, and
   g. a chain attached to the arch member for preventing the boom from pivoting.

6. The combination of claim 5 further comprising stop means for limiting the pivoting of the telescoping boom with respect to the base.

* * * * *